US012617654B2

(12) United States Patent
Shinde

(10) Patent No.: US 12,617,654 B2
(45) Date of Patent: May 5, 2026

(54) BRIDGE DEVICE AND METHOD FOR ELEVATOR

(71) Applicant: Inventio AG, Hergiswil (CH)

(72) Inventor: Ulhas Shinde, Pune Maharashtra (IN)

(73) Assignee: INVENTIO AG, Hergiswil (CH)

( * ) Notice: Subject to any disclaimer, the term of this patent is extended or adjusted under 35 U.S.C. 154(b) by 843 days.

(21) Appl. No.: 17/997,929

(22) PCT Filed: May 5, 2021

(86) PCT No.: PCT/EP2021/061902
§ 371 (c)(1),
(2) Date: Nov. 4, 2022

(87) PCT Pub. No.: WO2021/228664
PCT Pub. Date: Nov. 18, 2021

(65) Prior Publication Data

US 2023/0174344 A1 Jun. 8, 2023

(30) Foreign Application Priority Data

May 11, 2020 (EP) .................................... 20173822

(51) Int. Cl.
*B66B 5/00* (2006.01)
*B66B 3/00* (2006.01)

(52) U.S. Cl.
CPC ............ *B66B 5/0031* (2013.01); *B66B 3/002* (2013.01); *B66B 5/0087* (2013.01)

(58) Field of Classification Search
CPC ....... B66B 5/00; B66B 5/0031; B66B 5/0087; B66B 3/00; B66B 3/002
See application file for complete search history.

(56) References Cited

U.S. PATENT DOCUMENTS 5,487,448 A * 1/1996 Schollkopf ........... B66B 5/0006 187/280
9,365,394 B2 * 6/2016 Rees ..................... B66B 5/0087
(Continued)

FOREIGN PATENT DOCUMENTS

CN 104755403 A 7/2015
JP 6366789 B1 7/2018
(Continued)

OTHER PUBLICATIONS

Charanjeet Singh & Donald Franklin, Elevators: Door Monitoring & Other Retroactive Requirements, Build Safe/Live Safe Conference 2019, May 10, 2019, New York City Department of Buildings, New York, NY, USA.
(Continued)

*Primary Examiner* — Eduardo Colon Santana
(74) *Attorney, Agent, or Firm* — Shumaker, Loop & Kendrick, LLP

(57) ABSTRACT

A bridge device and a bridging method are used to monitor an elevator. The bridge device includes a jumper for bridging an electric element of the elevator when the elevator works in a first operating mode, a monitoring means monitoring the jumper, and an alarm unit that generates an alarm signal if the monitoring means determines that the element has been bridged by the jumper longer than a predefined time period when the elevator is operated in a second operating mode.

12 Claims, 2 Drawing Sheets

(56) References Cited

U.S. PATENT DOCUMENTS

| | | | | |
|---|---|---|---|---|
| 2011/0036668 | A1* | 2/2011 | Stratmann | B66B 5/02 187/289 |
| 2014/0117777 | A1* | 5/2014 | Rees | B66B 5/0087 307/115 |
| 2014/0247531 | A1 | 9/2014 | Madar | |
| 2016/0311653 | A1 | 10/2016 | Muller et al. | |

FOREIGN PATENT DOCUMENTS

| | | | |
|---|---|---|---|
| WO | 2011090665 | A2 | 7/2011 |
| WO | 2017050785 | A1 | 3/2017 |
| WO | 2018163922 | A1 | 9/2018 |

OTHER PUBLICATIONS

National Elevator Industry, Inc., Elevator Door Safety And Accident Prevention, announcement, Feb. 1, 2012, National Elevator Industry, Inc., Centreville, VA, USA.

* cited by examiner

BRIDGE DEVICE AND METHOD FOR ELEVATOR

FIELD

The invention relates to a bridge device and a bridging method for an elevator and an elevator with such a bridge device or monitored by such a method.

BACKGROUND

An elevator comprises an elevator car being movable vertically in an elevator shaft (hoistway) and may stop at different floors or stories of a multi-story building, wherein there is an elevator control system being responsible for coordinating all aspects of elevator service and functions. Typically, an elevator includes a plurality of safety-relevant components and protection devices, e.g., door contacts, emergency switches, overspeed-devices, etc. which are connected in series to prevent the elevator from being able to start up if any of the components does not function properly. Such a series of numerous protection devices are commonly referred to as a safety chain that is prescribed by several standard regulations as e.g. EN81-1. If any one of the devices fails or is open, the safety chain is consequently broken so that the elevator will be blocked from current operating. Only when the contacts of all the protection devices within the safety chain are closed, the safety chain will permit further operating with the elevator. There are a lot of different sensors of the elevator that monitor respectively safety-related functions like car speed, position and door-lock state, etc. The sensors send detected data or signals to a controller of or for the elevator. For instance, if a sensor informs a controller that a shaft door lock is not engaged, the controller will prevent a movement of the elevator car until this problem is resolved.

After an elevator is installed, regular maintenance and periodic testing and inspection must be performed for the elevator by necessary or under specifications and regulations. During these procedures, a bypass unit (also called as bridge unit or jumper) may be used to bypass, short circuit or interrupt certain components or switches of the elevator. Especially, the safety chain or one or more of the protection devices sometimes need to be bypassed temporarily during installation or inspection work. Then a wire bridge or jumper can be used by a technician to bridge such a protection device or its contact for troubleshooting and testing. For instance, to test a shaft door switch, a technician may bridge this door switch by using an electric jumper to allow the elevator car travels while this shaft door is unlocked. In this case, the safety chain of the elevator is bypassed by the jumper at this unlocked shaft door. Such an electric jumper typically includes a conduit configured to bypass an opened electric switch so that it permits electrical current to flow along this bypass pathway through the jumper over the switch. Once this testing is finished, the technician must remove the jumper from the bridged door switch in order to make this switch work functionally again. But it happens often that the jumper could be inadvertently left in place after servicing the elevator so that a serious safety hazard might occur, as the bridged shaft door contact has been taken apart from the safety chain. Therefore, it is to minimize as much as possible the risks caused by an unintentional bypassing of a safety-relevant component of a safety chain by a jumper that has been mistakenly left in the working place.

WO 2011090665 A2 describes an elevator safety tool for short-circuiting an elevator switch. The tool includes a control module and a relay, wherein the relay has a switch having a closed and an open position. The control module receives status data and determines whether the operating status is "normal" or "service". The switch is closed when the elevator is in service, and open when the elevator is in normal operation. Even though such a safety tool may reduce the risk caused by an inadvertently left bridge unit, but the safety tool requires service technicians not only to connect the safety tool to a switch which is to be short-circuited but also to an elevator control to receive status data.

Therefore, a need exists for a simple possibility that may further reduce the potential risks associated with using bridge devices in the installation or maintenance procedures of elevators.

SUMMARY

An object of this invention of the present patent application may be to disclose a bypassing possibility which can be carried out safely for an elevator to meet the demand to avoid the above-mentioned disadvantage of using a conventional jumper.

Such an object may be achieved by the subject-matter of the exemplary embodiments that are evident from the following description.

According to this present invention, the first aspect relates to a bridge device for an elevator, wherein the bridge device comprises a jumper for bridging an electric element of the elevator when the elevator works in its first operating mode. The bridge device is provided further with a monitoring means for monitoring the jumper and an alarm unit which is capable of generating an alarm signal if the monitoring means determines that the element has been bridged by the jumper longer than a predefined time period when the elevator is operated in a second operating mode. The time counting of the bridging may begin from when the elevator is switched back into its first operating mode. The alarm signal can be an electrical, optical, acoustic or vibrating signal. The predefined period can be also set and modified dynamically by the provider or the user of the bridge device.

According to this present invention, the second aspect involves a method for bridging an electric element of an elevator. This method may comprise following steps: bridging the electric element by a jumper when the elevator works in a first operating mode, monitoring the jumper, and generating an alarm signal if the element has been bridged by the jumper longer than a predefined period when the elevator works in a second operating mode.

The third aspect of this present invention relates to an elevator comprising one or more abovementioned bridge devices or monitored by the aforementioned method.

As an improvement of the present invention, the first operating mode of the elevator is an operation mode for maintaining or inspecting this elevator, while the second operating mode is a normal operating mode of the elevator. That means that the jumper needs to be monitored only when the elevator works in its normal operating mode. Then a dangerous situation that a safety chain of an elevator remains completely or partially bridged by a bridge device during the normal operating of the elevator can be avoided.

As a further improvement of the present invention, the monitoring means comprises a wired and/or wireless interface for sending the generated alarm signal to a controller of the elevator, a remote center and/or to a mobile device like a smartphone or a mobile control terminal. The communicating between the bridge device and a signal receiver is based e.g. on Bluetooth or ZigBee-Technology which is typically used in a low-power, low data rate ad hoc network. By receiving the alarm signal, there are several possibilities to solve this problem. For example, either the elevator shuts itself down immediately or the remote center controls the elevator remotely or a technician having the mobile device will get an instruction to remove the bridge device as soon as possible.

As another further improvement of the present invention, the monitoring means comprises an electrical current sensor for measuring an electrical current through the jumper. Measuring an electrical current is more reliable than measuring an electrical voltage or electrical resistance to detect whether a switch contact is closed or open.

As another further improvement of the present invention, the bridge device comprises a power supply unit that may either share the same power supply of the elevator or be arranged as an own power supply for the bridge device, e.g. an electric energy storage unit like a battery.

At least one of the afore-mentioned implementation examples offers one or more solutions to the problems and disadvantages of the known prior art. Other technological benefits of the present invention become evident to a person skilled in the art from the following description. The numerous examples of implementing the present invention achieve only a part of the presented advantages. None of the advantages is critical to the examples of implementation. Any required embodiment can technically be combined with any other required embodiment. The examples represent only a few advantageous embodiments and they do not limit the idea of the invention that can be implemented even in other manners within the framework of the claims presented further below.

BRIEF DESCRIPTION OF THE DRAWINGS

Below embodiments of the present invention are described in more detail regarding the attached drawings. The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
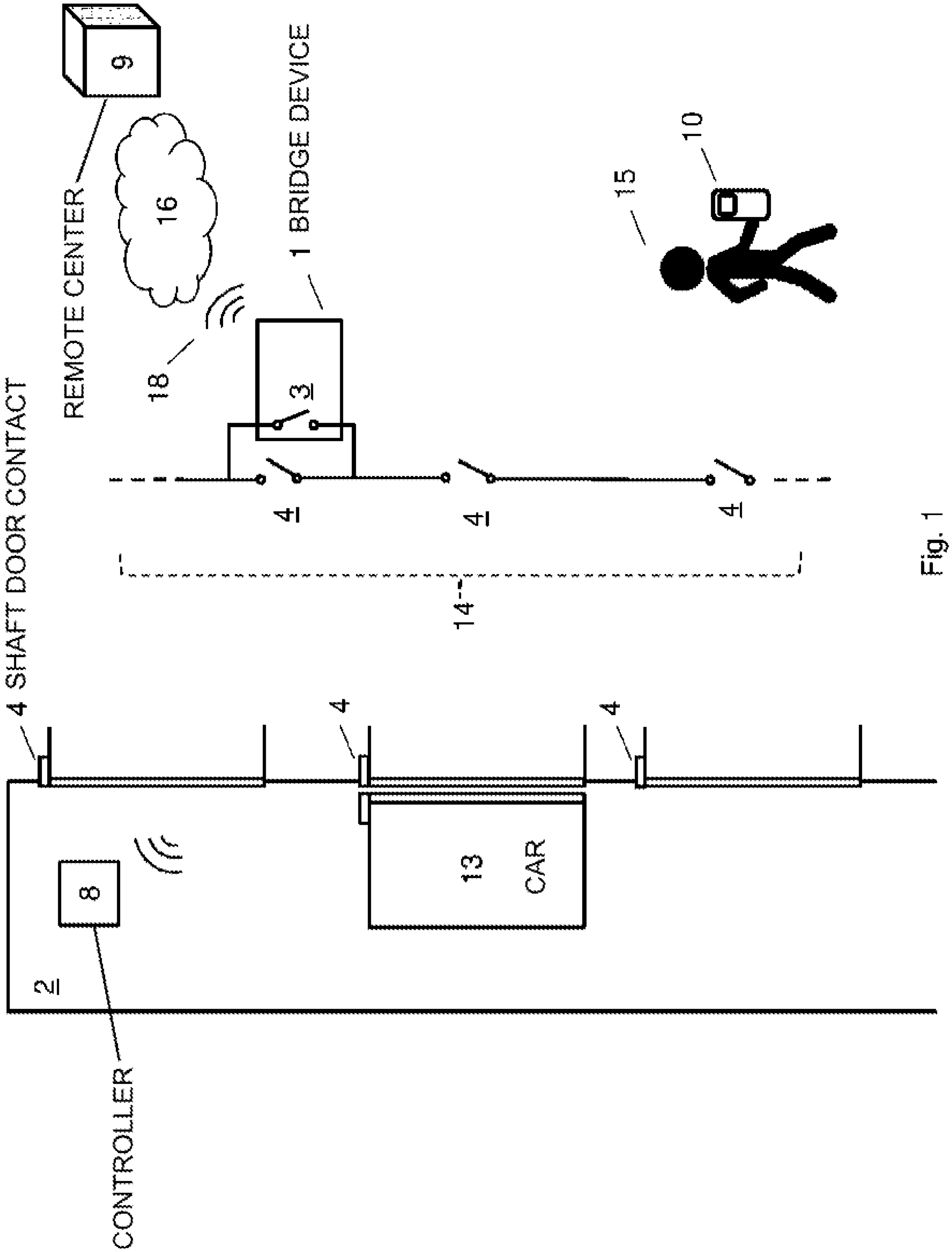
FIG. 1 shows a schematic illustration of one embodiment of a method of bridging an electric element of an elevator.

FIG. 1 schematically illustrates one example of a bridge device 1 disclosed herein for an elevator 2. This elevator 2 comprises an elevator car 13 being moveable up and down in a vertically extending shaft of a building (not indicated). A safety chain 14 of this elevator 2 consists of a plurality of safety-relevant devices or electric elements 4 like the shaft door contacts that are connected in an electrical series circuit. The safety chain 14 is shown by a simplified schematic illustration beside the illustrated elevator 2.

The elevator 2 has been maintained by a technician 15 so that the elevator 2 is switched in its maintenance operating mode. During this maintenance working, the technician 15 needs to bypass one of the elements 4 temporarily by the bridge device 1 for starting a test procedure. Then he bridges an element 4 by using the jumper 3 of the bridge device 1. When the test procedure and the maintenance working are finished, the technician 15 should switch the elevator 2 back into its normal operating mode. Then it has to be monitored whether this element 4 is still bridged by the bridge device 1. If the technician 15 left there for home but has forgotten to take the jumper 3 away so that the element 4 remains bridged, the bridge device 1 will generate an alarm signal 18 when a predefined time period has been extended. The predefined period can be set e.g. for 10 seconds since the elevator 2 has been switched back into its normal operating mode, the technician 15 may also set the period newly as long as he wishes.

The alarm signal 18 could be an optical and/or acoustic signal. When the technician 15 hears or sees this alarm signal 18, he will recognize this potential safety risk immediately before he leaves the place of the elevator 2. Even though when the technician 15 has already left there, the alarm signal 18 can be sent through a wireless communication network 16 to a remote center 9 of the elevator 2 or a mobile device 10, e.g. smartphone, laptop, tablet PC or PDA, of the technician 15. When he has received the alarm signal 18 or got an instruction from the remote center 9, he will return to the elevator 2 and remove the bridge device 1 from the element 4. Alternatively, the alarm signal 18 can be communicated to a main controller 8 of the elevator 2 so that the elevator 2 may shut itself down automatically after a certain time in case the technician 15 does not confirm the alarm signal 18 or is not back taking the bridge device 1 away. Hence a risky situation that an unintentional and unsafe bypass existing in the safety chain 14 of a normally operated elevator 2 can be avoided.

Figure 2:
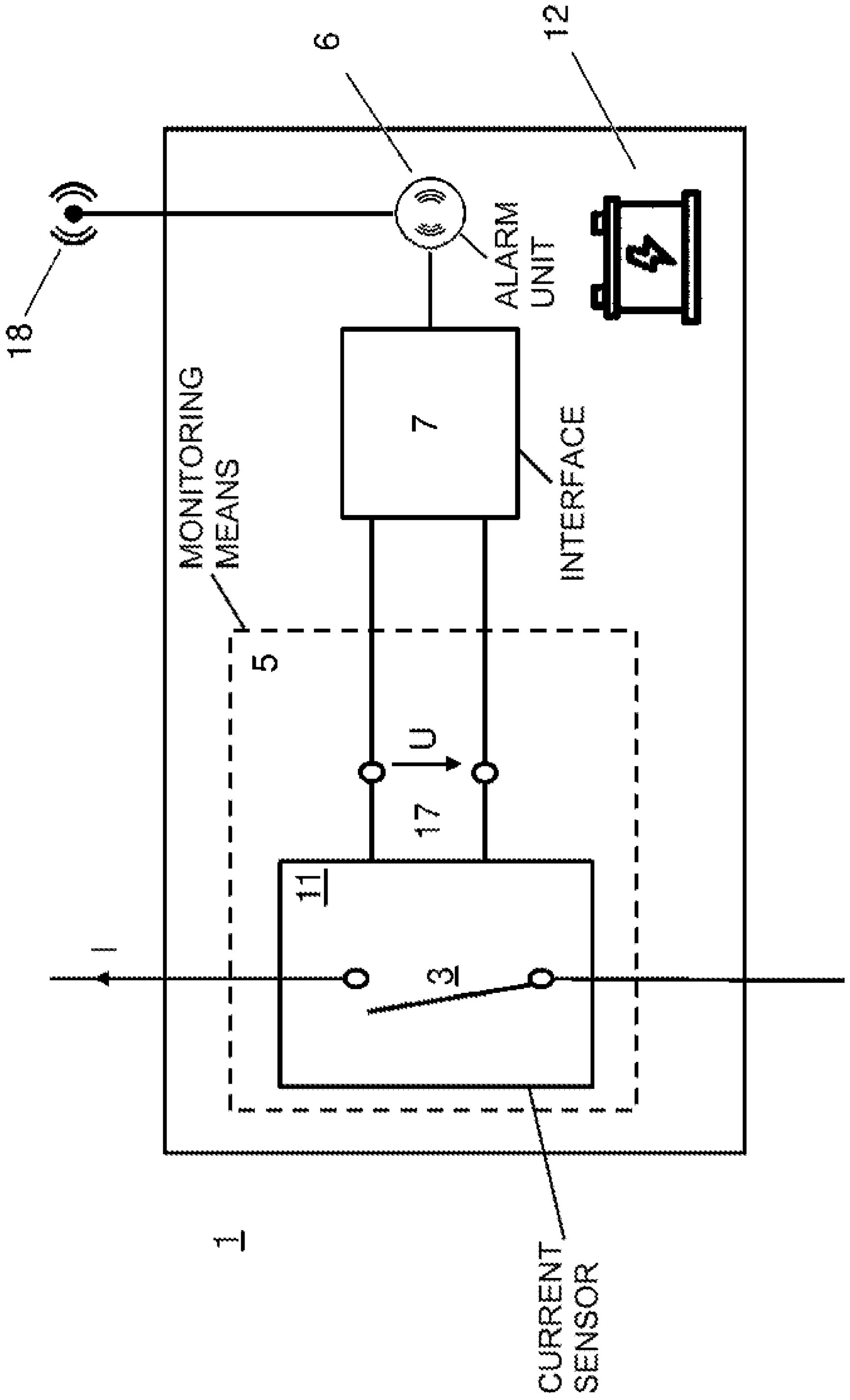
FIG. 2 shows a schematic illustration of a bridge device according to the aforementioned invention.

As shown in FIG. 2, a bridge device 1 according to the present invention comprises a jumper 3 for bridging an electric element 4 of an elevator 2 when the elevator 2 is operated in a maintenance operating mode. The bridge device 2 is provided further with a monitoring means 5 for monitoring the jumper 3 and an alarm unit 6 for generating an alarm signal 18.

The monitoring means 5 comprises an electrical current sensor 11 to measure an electrical current I through the jumper 3, as the electrical current I will flow through the bypass built by the jumper 3 in case the element 4 is bridged. At the output 17 of the sensor 11, a voltage U thus can be detected accordingly. Upon this detected voltage signal it can be monitored whether the element 4 is currently bridged or not. The monitoring means 5 determines that the element 4 has been bridged by the jumper 3 longer than a predefined time period when the elevator 2 is operated again in its normal operating mode.

The monitoring means 5 comprises a wireless interface 7, e.g. a transceiver that is able to send the generated alarm signal 18 in a suitable form of digital data, voice and/or text (e.g. SMS: Short Message Service) to an external controller of or for the elevator 2. This interface 7 may enable communications by wireless technology e.g. as Bluetooth or ZigBee. Such an interface supports as well as mobile connectivity standards like 4G/LTE, 5G and VoIP functionality. Moreover, this interface 7 may work with a wired network. Furthermore, the bridge device 1 comprises a power supply unit 12, e.g. an electric energy storage unit comprising one or more batteries. The power supply unit 12 can supply energy to this bridge device 1.

It is obvious to a person skilled in the art that with the advancement of technology, the basic idea of the invention may be implemented in various ways. The invention and its embodiments are thus not limited to the examples described above, instead, they may vary within the scope of the claims.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A bridge device for an elevator, the bridge device comprising:

a jumper adapted to bridge an electric element of the elevator when the elevator is being operated in a first operating mode;

a monitoring means monitoring a bridging status of the jumper;

an alarm unit connected to the monitoring means;

wherein the alarm unit generates an alarm signal when the monitoring means determines that the element has been bridged by the jumper longer than a predefined time period when the elevator is being operated in a second operating mode; and wherein the monitoring means includes an electric current sensor measuring an electric current flowing through the jumper.

2. The bridge device according to claim 1 wherein the first operating mode is an operation mode for maintaining or inspecting the elevator and the second operating mode is a normal operating mode of the elevator.

3. The bridge device according to claim 1 wherein the monitoring means includes an interface sending the generated alarm signal to at least one of a controller of the elevator, a remote center and a mobile device.

4. The bridge device according to claim 3 wherein the interface is a wireless interface.

5. The bridge device according to claim 1 including a power supply unit supplying energy to the bridge device.

6. The bridge device according to claim 1 wherein the alarm unit generates the alarm signal as an electrical, optical, acoustic or vibrating signal.

7. An elevator comprising: an electric element of the elevator; and the bridge device according to claim 1 adapted to bridge the electric element.

8. A method for bridging and monitoring an electric element of an elevator, the method comprising the steps of:

bridging the electric element by a jumper when the elevator is operated in a first operating mode;

measuring an electrical current flowing through the jumper;

monitoring a bridging status of the jumper; and generating an alarm signal when the element has been bridged by the jumper longer than a predefined time period when the elevator is operated in a second operating mode as determined by the monitoring.

9. The method according to claim 8 wherein the first operating mode is an operation mode for maintaining or inspecting the elevator and the second operating mode is a normal operating mode of the elevator.

10. The method according to claim 8 including sending the generated alarm signal to at least one of a controller of the elevator, a remote center and a mobile device.

11. The method according to claim 8 wherein the alarm signal is generated as an electrical, optical, acoustic or vibrating signal.

12. An elevator comprising:

an electric element;

a jumper adapted to bridge the electric element when the elevator is being operated in a first operating mode;

a monitoring means monitoring the jumper;

an alarm unit connected to the monitoring means; and monitoring the electric element according to the method of claim 8 wherein the alarm unit generates an alarm signal when the monitoring means determines that the element has been bridged by the jumper longer than the predefined time period when the elevator is being operated in the second operating mode.

* * * * *